United States Patent
Ichinowatari et al.

(10) Patent No.: US 10,158,986 B2
(45) Date of Patent: Dec. 18, 2018

(54) SATELLITE COMMUNICATION SYSTEM CONTROLLING GATE IN AN EMERGENCY

(71) Applicant: Kabushiki Kaisha Toshiba, Minato-ku, Tokyo (JP)

(72) Inventors: Kazuya Ichinowatari, Tokyo (JP); Yoshinori Matsumoto, Tokyo (JP); Takashi Fukuyama, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/238,480

(22) Filed: Aug. 16, 2016

(65) Prior Publication Data

US 2017/0055140 A1    Feb. 23, 2017

(30) Foreign Application Priority Data

Aug. 19, 2015  (JP) .................................. 2015-162290
Jun. 29, 2016  (JP) .................................. 2016-129297

(51) Int. Cl.
*H04B 7/185* (2006.01)
*H04W 4/90* (2018.01)
(Continued)

(52) U.S. Cl.
CPC .......... *H04W 4/90* (2018.02); *H04B 7/18513* (2013.01); *H04B 17/318* (2015.01);
(Continued)

(58) Field of Classification Search
CPC ....................................... H04B 7/185–7/18597
(Continued)

(56) References Cited

U.S. PATENT DOCUMENTS

| 2002/0080038 A1* | 6/2002 | Smith | .................. | G01W 1/02 |
| | | | | 340/601 |
| 2004/0037238 A1* | 2/2004 | Schiff | ............... | H04B 7/18543 |
| | | | | 370/321 |

(Continued)

FOREIGN PATENT DOCUMENTS

| JP | A-57-132437 | 8/1982 |
| JP | A-61-232727 | 10/1986 |

(Continued)

*Primary Examiner* — Philip Sobutka

(74) *Attorney, Agent, or Firm* — Knobbe, Martens, Olson & Bear, LLP

(57) ABSTRACT

A satellite communication system and a data transmission method in satellite communication capable of improving the reliability of a system in satellite communication are provided. The satellite communication system of an embodiment includes a first communication device, a second communication device, and a slave station. The first communication device receives emergency information about disaster and transmits gate closing control data for issuing a command for closing a gate related to the disaster via a satellite. The second communication device is installed in a place geographically separated from the first communication device and receives emergency information about disaster and transmits gate closing control data for issuing an commands for closing a gate related to the disaster via a satellite. The slave station controls opening-closing of the gate on the basis of the gate closing control data received from the first communication device or the second communication device.

14 Claims, 14 Drawing Sheets

(51) Int. Cl.
*H04B 17/318* (2015.01)
*H04W 52/24* (2009.01)
*H04L 12/24* (2006.01)
*H04W 24/08* (2009.01)
*H04W 4/38* (2018.01)
*H04L 1/22* (2006.01)
*H04B 17/23* (2015.01)

(52) U.S. Cl.
CPC ............... *H04L 1/22* (2013.01); *H04L 41/22* (2013.01); *H04W 4/38* (2018.02); *H04W 24/08* (2013.01); *H04W 52/245* (2013.01); *H04B 17/23* (2015.01); *H04W 52/246* (2013.01)

(58) Field of Classification Search
USPC ....................................................... 455/12.1
See application file for complete search history.

(56) References Cited

U.S. PATENT DOCUMENTS

| | | | |
|---|---|---|---|
| 2010/0115093 A1* | 5/2010 | Rice | H04L 12/2825 709/224 |
| 2013/0307975 A1* | 11/2013 | Ford | B60Q 1/00 348/143 |

FOREIGN PATENT DOCUMENTS

| | | |
|---|---|---|
| JP | A-2001-117628 | 4/2001 |
| JP | A-2002-157309 | 5/2002 |
| JP | A-2004-072634 | 3/2004 |
| JP | 2007-096581 A | 4/2007 |
| JP | A-2014-163067 | 9/2014 |

* cited by examiner

SATELLITE COMMUNICATION SYSTEM CONTROLLING GATE IN AN EMERGENCY

BACKGROUND OF THE INVENTION

Field of the Invention

Embodiments of the present invention relate to a satellite communication system and a data transmission method in satellite communication.

Description of Related Art

When a large-scale disaster such as a major earthquake occurs and a communication channel of a terrestrial network is cut off, it is necessary to secure a communication channel for transmitting information necessary for reconstruction or national protection. Thus, satellite communication is also used in a wireless system for disaster, etc. required to transmit information toward a large number of bases.

However, because the satellite communication is susceptible to rain due to characteristics of the communication channel, the reliability of the system is likely to deteriorate.

Japanese Unexamined Patent Application, First Publication No. 2007-096581 is an example of the related art.

SUMMARY OF THE INVENTION

An object of the present invention is to provide a satellite communication system and a data transmission method in satellite communication capable of improving the reliability of a system in satellite communication.

A satellite communication system of an embodiment includes a first communication device, a second communication device, and a slave station. The first communication device receives emergency information about disaster and transmits gate closing control data for issuing a command for closing a gate related to the disaster via a satellite. The second communication device is installed in a place geographically separated from the first communication device and receives emergency information about disaster and transmit gate closing control data for issuing a commands for closing a gate related to the disaster via a satellite. The slave station controls opening-closing of the gate on the basis of the gate closing control data received from the first communication device or the second communication device.

DETAILED DESCRIPTION OF THE INVENTION

Hereinafter, a satellite communication system and a data transmission method according to embodiments will be described with reference to the drawings.

In the present invention, the embodiments in which a satellite communication network is used in a system for receiving an emergency alert (emergency information) and gates such as a sluice gate and a floodwall gate are immediately closed simultaneously when an emergency alert (for example, J-ALERT) related to disasters such as an earthquake and a tsunami is generated by a national agency will be described. Here, the emergency alert is an emergency notification to be transmitted to a corresponding region via a fire department or the like by a meteorological agency which is a national agency, and is, for example, information indicating that a large-scale disaster such as an earthquake or a tsunami has occurred or will occur or information about an alert or a warning. In the following description, an example in which an alert and a warning related to the occurrence of a tsunami is generated according to J-ALERT serving as the emergency alert will be described. In the present embodiment, two control station facilities are used to improve the reliability of the system.

Figure 1:
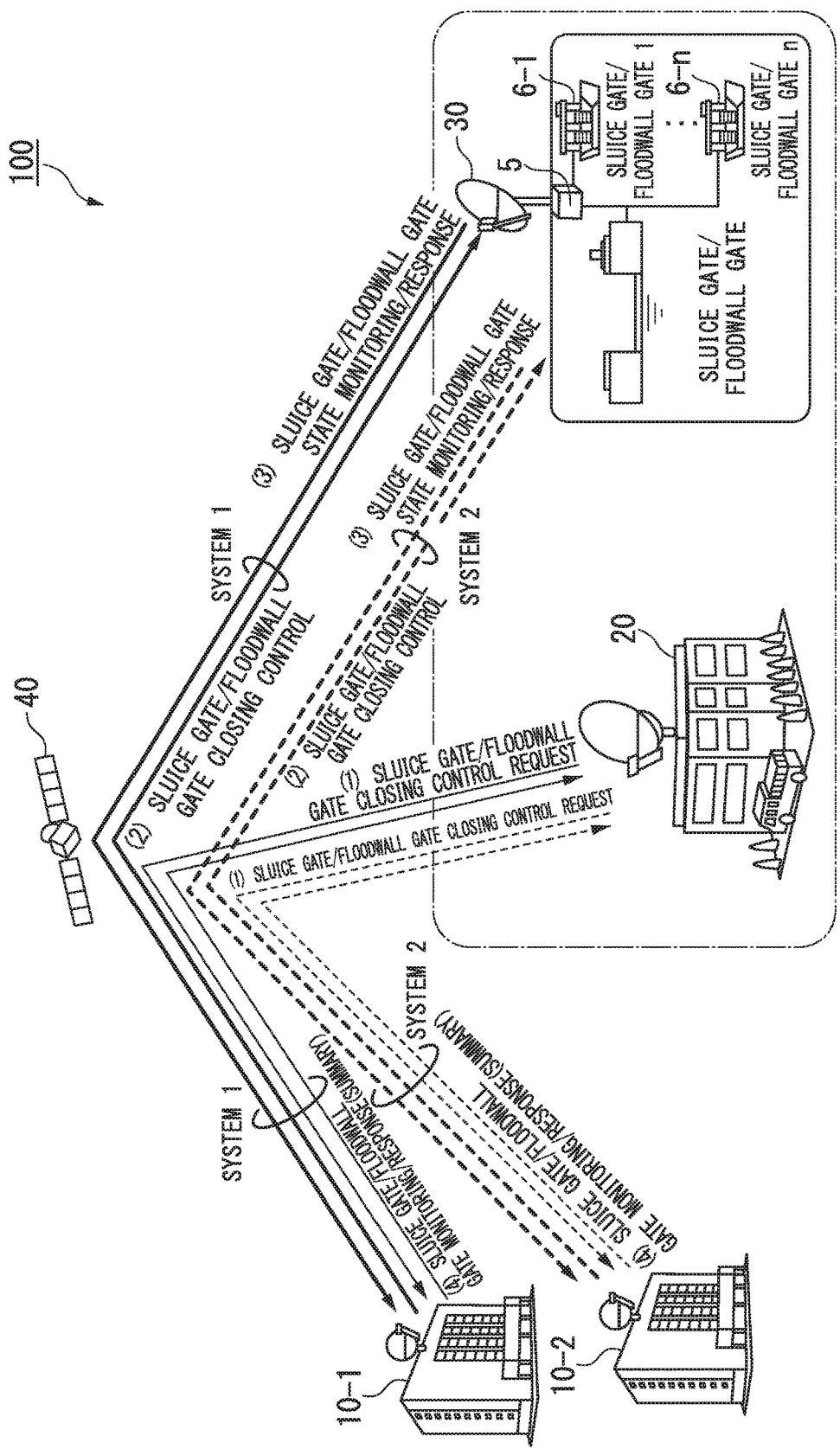
FIG. 1 is a diagram illustrating a system configuration of a satellite communication system 100 of an embodiment.

FIG. 1 is a diagram illustrating a system configuration of a satellite communication system 100 of an embodiment.

The satellite communication system 100 includes a first control station facility 10-1, a second control station facility 10-2, a control center facility 20, and a slave station 30. Each of the first control station facility 10-1, the second control station facility 10-2, the control center facility 20, and the slave station 30 is connected so that mutual communication is enabled via a communication satellite 40. A plurality of control center facilities 20 and a plurality of slave stations 30 may be located in the satellite communication system 100.

The first control station facility 10-1 is, for example, a facility provided in a public office which is the center of an administrative region (for example, a metropolitan office, a provincial office, or a prefectural office in the case of the prefectural unit system). The first control station facility 10-1 notifies the slave station 30 of a closing command via the communication satellite 40 according to reception of the emergency alert (for example, J-ALERT). The first control station facility 10-1 controls the opening-closing of all gates 6 managed by the control center facility 20 (for example, within the corresponding prefecture in the case of the prefectural unit system). The gate 6 is, for example, a sluice gate or a floodwall gate. Further, in response to the commands from the control center facility 20, the gate 6 is closed by transmitting a command for closing the gate 6 (hereinafter referred to as a "closing commands") to the slave station 30. A specific process related to the closing of the gate 6 will be described below. Also, the first control station facility 10-1 receives signals transmitted from the second control station facility 10-2 to the control center facility 20 and the slave station 30 to monitor the state of the second control station facility 10-2.

Because the second control station facility 10-2 is provided for the purpose of complementing the first control station facility 10-1, the second control station facility 10-2 is installed in, for example, a place geographically separated from the prefectural office. For example, the second control station facility 10-2 is a facility provided in a common building for government offices separated from the prefectural office. By installing the second control station facility 10-2 in the geographically separated place, it is possible to reduce the influence of a link disconnection of a satellite link due to localized torrential rain. The second control station facility 10-2 performs a process similar to that of the first control station facility 10-1.

The control center facility 20 is a facility which supervises a smaller region than the first control station facility 10-1 and the second control station facility 10-2. The control center facility 20 is a facility provided in a control center, for example, such as a common building for government offices, a fire station, or a municipality. The control center facility 20 manages the slave station 30 and the gate 6 within a jurisdiction of the control center. The control center facility 20 can transmit the closing commands to the first control station facility 10-1 and the second control station facility 10-2 in response to a command of a staff member of the control center. In the present embodiment, the commands for closing the gate 6 is transmitted to the slave station 30 via the control station facility 10.

The slave station 30 is connected to one or more gates (sluice gates or floodwall gates) 6-1 to 6-n (n is an integer greater than or equal to 2). Also, in the following description, the first control station facility 10-1 and the second control station facility 10-2 are referred to as the control station facility 10 when they are not particularly distinguished. The slave station 30 transmits information for controlling the closing of the gate 6 connected to the slave station 30 to the gate 6 in response to the closing commands from the control station facility 10.

The communication satellite 40 relays communication among the control station facility 10, the control center facility 20, and the slave station 30.

Figure 2:
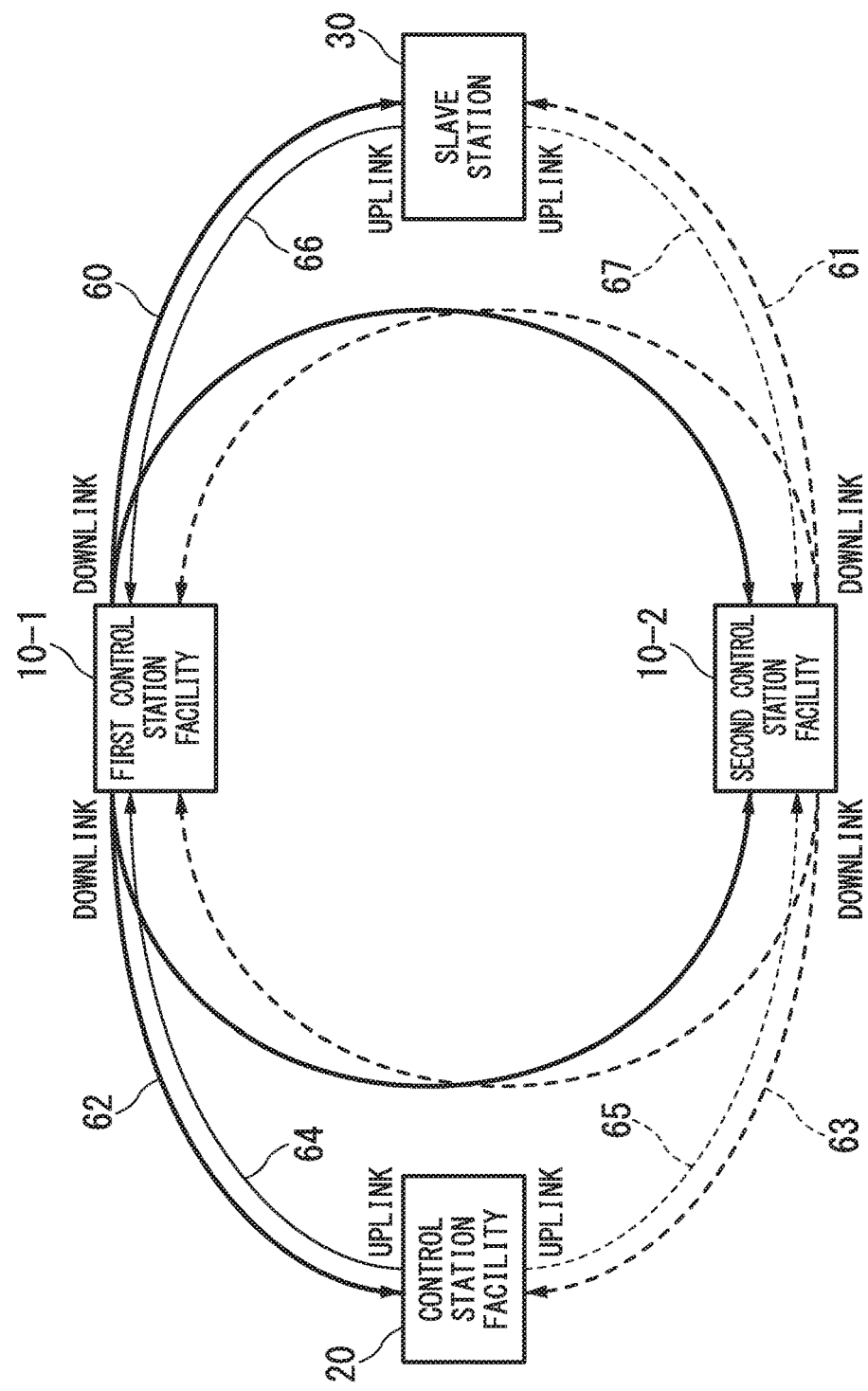
FIG. 2 is a diagram illustrating a communication configuration of the satellite communication system 100 in the present embodiment.

FIG. 2 is a diagram illustrating a communication configuration of the satellite communication system 100 in the present embodiment. In FIG. 2, a signal transmitted/received by the first control station facility 10-1 is indicated by a solid line and a signal transmitted/received by the second control station facility 10-2 is indicated by a dotted line. Here, links from the control station facility 10 to the control center facility 20 and the slave station 30 are downlinks and links from the control center facility 20 and the slave station 30 to the control station facility 10 are uplinks.

Figure 3:
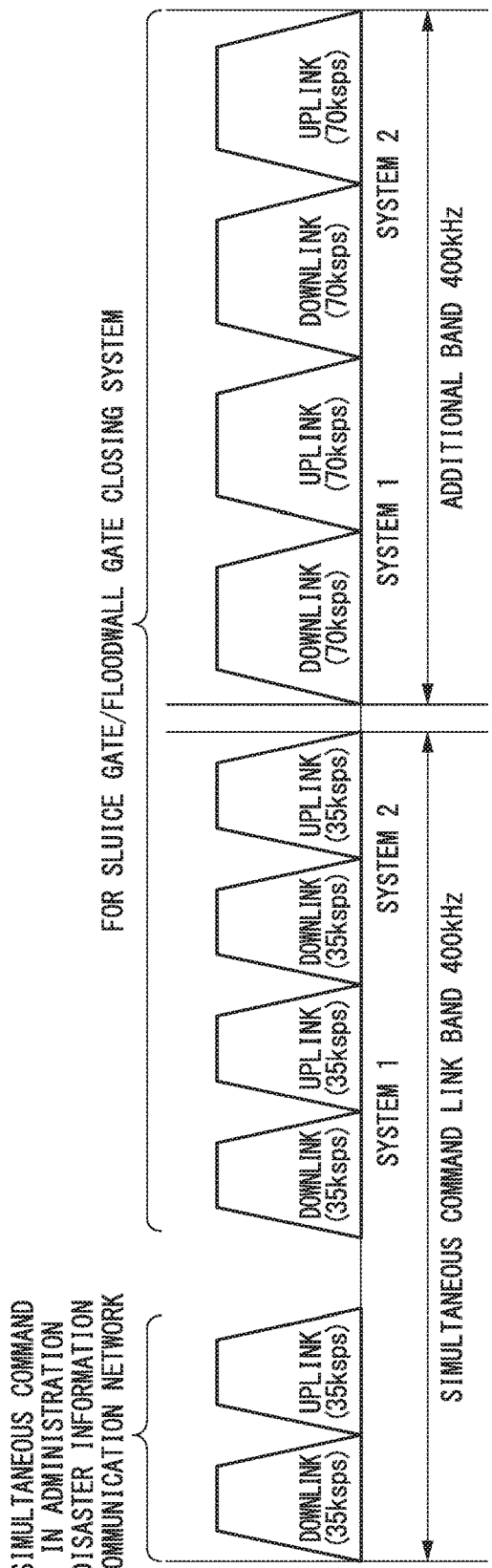
FIG. 3 is a diagram illustrating bands used in the satellite communication system 100.

FIG. 3 is a diagram illustrating bands used in the satellite communication system 100.

As illustrated in FIG. 3, a simultaneous command link band and an additional band are used in the satellite communication system 100. In FIG. 3, a band shown in the uplink/downlink of system 1 is used in communication of the uplink/downlink between the first control station facility 10-1 and the control center facility 20 and communication of the uplink/downlink between the first control station facility 10-1 and the slave station 30. More specifically, the simultaneous command link band is used in the communication of the uplink/downlink between the first control station facility 10-1 and the control center facility 20 and the additional band is used in the communication of the uplink/downlink between the first control station facility 10-1 and the slave station 30. In FIG. 3, a band shown in the uplink/downlink of system 2 is used in communication of the uplink/downlink between the second control station facility 10-2 and the control center facility 20 and communication of the uplink/downlink between the second control station facility 10-2 and the slave station 30. More specifically, the simultaneous command link band is used in the communication of the uplink/downlink between the second control station facility 10-2 and the control center facility 20 and the additional band is used in the communication of the uplink/downlink between the second control station facility 10-2 and the slave station 30.

Figure 4:
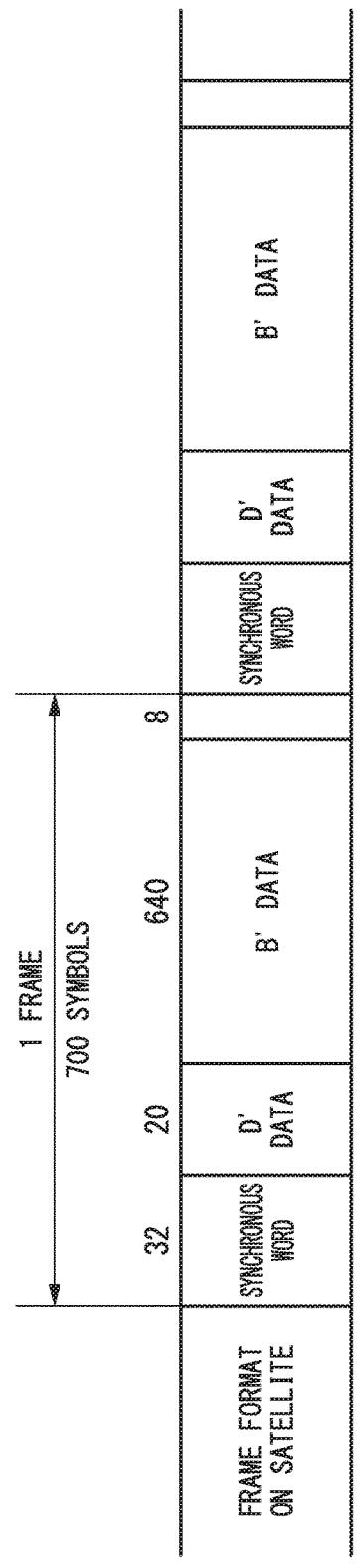
FIG. 4 is a diagram illustrating a specific example of a frame format used in satellite communication.

FIG. 4 is a diagram illustrating a specific example of a frame format used in satellite communication.

As illustrated in FIG. 4, a frame used in the satellite communication has fields of a synchronous word, D' data, and B' data. The field of the D' data stores gate closing control information from the control station facility 10 to the control center facility 20 or the slave station 30. The gate closing control information is an commands for closing the gate 6. The field of the B' data stores Internet protocol (IP) data or sound data. In the satellite communication system 100 in the present embodiment, the gate closing control information originally stored in the field of the D' data is also stored in the field of the B' data. Thus, when the region of the B' data is also used in transmission of the gate closing control information, it is possible to efficiently perform the transmission of a closing commands signal to a large number of slave stations 30 to be controlled. A configuration in which the region of the B' data is also used in the transmission of the gate closing control information is effective when the number of slave stations 30 is significantly large and transmission is instantaneously required.

Figure 5:
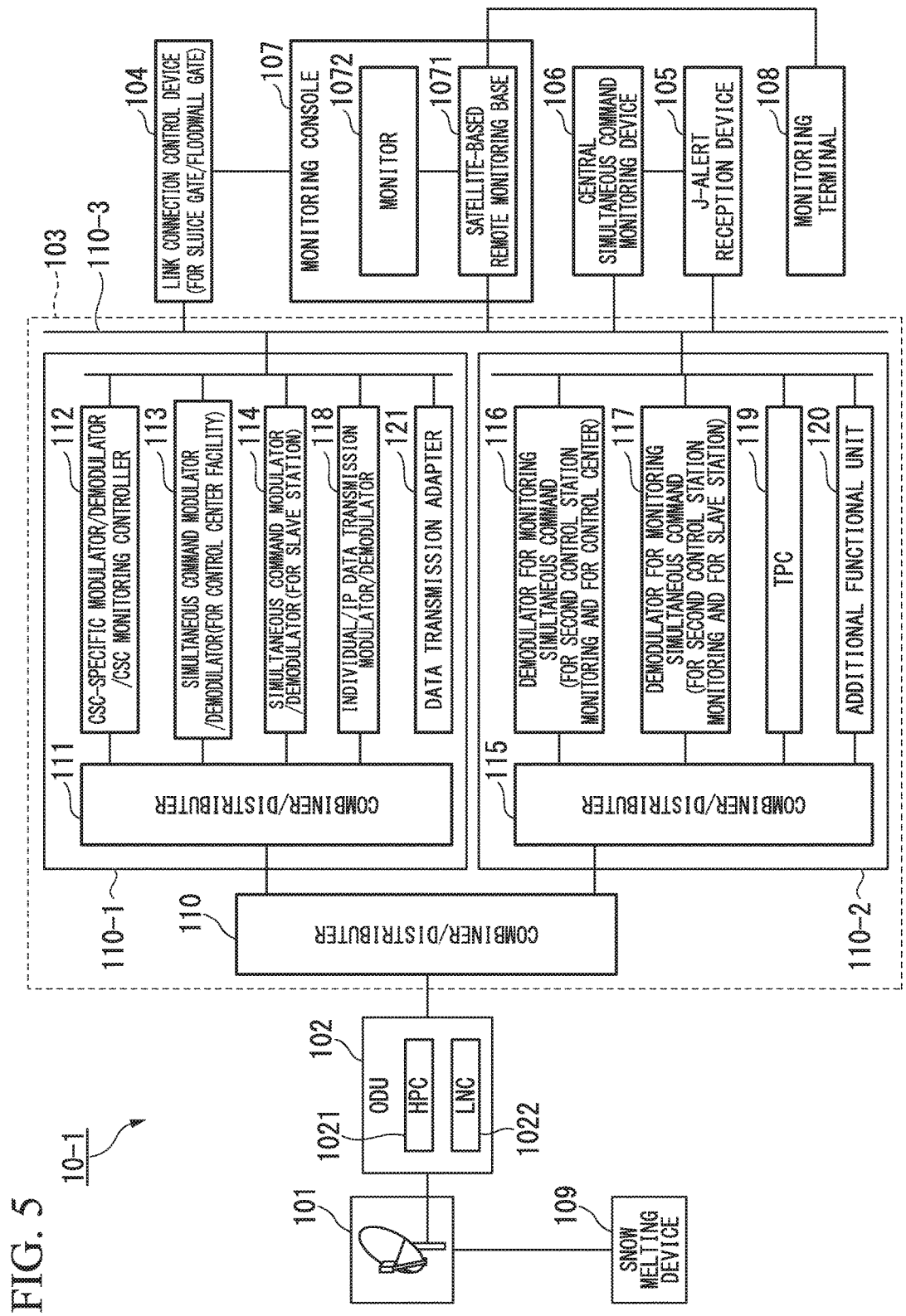
FIG. 5 is a schematic block diagram illustrating a functional configuration of a first control station facility 10-1.

FIG. 5 is a schematic block diagram illustrating a functional configuration of the first control station facility 10-1.

The first control station facility 10-1 includes an antenna 101, an outdoor unit (ODU) 102, an indoor unit (IDU) 103, a link connection control device 104, a J-ALERT reception device 105, a central simultaneous command monitoring device 106, a monitoring console 107, a monitoring terminal 108, and a snow melting device 109.

The antenna 101 communicates with the communication satellite 40. The antenna 101 has a snow accretion prevention function of the snow melting device 109.

The ODU 102 performs frequency conversion into a frequency band for use in the satellite communication and amplifies power of a signal. The ODU 102 includes a high power converter (HPC) 1021 and a low noise converter (LNC) 1022.

The HPC 1021 performs frequency conversion of an IP signal to be transmitted and amplifies power.

The LNC 1022 performs amplification and frequency conversion on an RF signal input from the antenna 101 and outputs a signal after the amplification and the frequency conversion to the IDU 103.

The IDU 103 includes a combiner/distributer 110, a first housing 110-1, a second housing 110-2, and an L2 switch 110-3.

The combiner/distributer 110 combines and distributes an intermediate frequency (IF) signal.

The first housing 110-1 includes a combiner/distributer 111, a crisis standard of care (CSC)-specific modulator/demodulator/CSC monitoring controller 112, a simultaneous command modulator/demodulator 113, a simultaneous command modulator/demodulator 114, an individual/IP data transmission modulator/demodulator 118, and a data transmission adapter 121.

The combiner/distributer 111 combines and distributes a signal.

The CSC-specific modulator/demodulator/CSC monitoring controller 112 modulates or demodulates a signal transmitted/received to/from a control station (not illustrated).

The simultaneous command modulator/demodulator 113 generates a simultaneous command modulation signal for simultaneously broadcasting control response information from the slave station 30 to all control center facilities 20. The control response information includes a response indicating a state of closing of the gate 6 (whether the gate 6 is closed). Also, the simultaneous command modulator/demodulator 113 demodulates a signal received from the control center facility 20.

The simultaneous command modulator/demodulator 114 generates a simultaneous command modulation signal for simultaneously broadcasting the closing commands to all the slave stations 30. Also, the simultaneous command modulator/demodulator 114 demodulates a signal received from the slave station.

The individual/IP data transmission modulator/demodulator 118 modulates or demodulates a signal of an individual/IP data transmission link. For example, the individual/IP data transmission modulator/demodulator 118 is used in phone communication or the like.

The data transmission adapter 121 converts a protocol and a format of a packet to be transmitted/received by the individual/IP data transmission modulator/demodulator 118.

The second housing 110-2 includes a combiner/distributer 115, a demodulator for monitoring simultaneous command 116, a demodulator for monitoring simultaneous command 117, a transmission power control (TPC) unit 119, and an additional functional unit 120.

The combiner/distributer 115 combines or distributes a signal.

The demodulator for monitoring simultaneous command 116 demodulates a simultaneous command transmitted from the second control station facility 10-2 to the control center facility 20 using a simultaneous command link.

The demodulator for monitoring simultaneous command 117 demodulates a simultaneous command transmitted from the second control station facility 10-2 to the slave station 30 using the simultaneous command link.

The TPC 119 has a TPC function of controlling transmission power. The TPC 119 detects reception power from the communication satellite 40 and controls transmission power to compensate for its attenuation when the deterioration in the received electric field intensity due to an influence such as rain attenuation is detected.

The additional functional unit 120 is used when a new functional unit is added to the second housing 110-2.

The link connection control device 104 aggregates information about states of station facilities (for example, the second control station facility 10-2, the control center facility 20, and the slave station 30) constructing a satellite link and transmits the information to a satellite-based remote monitoring base 1071. Also, the link connection control device 104 causes an commands input by the monitoring terminal 108 or the monitoring console 107 to be transmitted via the IDU 103.

The J-ALERT reception device 105 receives a I-ALERT received by the antenna 101 from the IDU 103. The J-ALERT reception device 105 outputs the received J-ALERT to the central simultaneous command monitoring device 106.

The central simultaneous command monitoring device 106 controls the entire control station facility 10. The central simultaneous command monitoring device 106 analyzes content of the J-ALERT received by the J-ALERT reception device 105 and displays an analysis result on the monitoring console 107 and the monitoring terminal 108.

The monitoring console 107 includes a satellite-based remote monitoring base 1071 and a monitor 1072. The satellite-based remote monitoring base 1071 enables an error to be confirmed at an early stage by displaying information about a state of each station facility output from the link connection control device 104. The monitor 1072 is, for example, a touch panel. The monitor 1072 receives an input of an operation commands from the user. Also, the monitor 1072 displays information about the state of each station facility.

The monitoring terminal 108 inputs and displays the commands of the user. For example, the monitoring terminal 108 is configured using an industrial personal computer (for example, factory automation-personal computer (FA-PC)). The monitoring terminal 108 includes a phone, a monitoring terminal control device, a monitor, and a power supply. The phone is used for a conversation with a user of another station. The monitoring terminal control device is a device which controls the monitoring terminal. The monitoring terminal control device is provided with a monitor. The monitor is an image display device such as a liquid crystal display, an organic electro luminescence (EL) display, or the like. The monitor displays information. The power supply supplies each functional unit with supplied power.

The snow melting device 109 is a heater. The snow melting device 109 detects the snowfall on the antenna 101 to melt the snow.

Next, each functional unit which performs a process different from that of the functional unit of the first control station facility 10-1 will be described for the second control station facility 10-2.

The demodulator for monitoring simultaneous command 116 of the second control station facility 10-2 demodulates a simultaneous command transmitted from the first control station facility 10-1 to the control center facility 20 using a simultaneous command link.

The demodulator for monitoring simultaneous command 117 of the second control station facility 10-2 demodulates a simultaneous command transmitted from the first control station facility 10-1 to the slave station 30 using a simultaneous command link.

Figure 6:
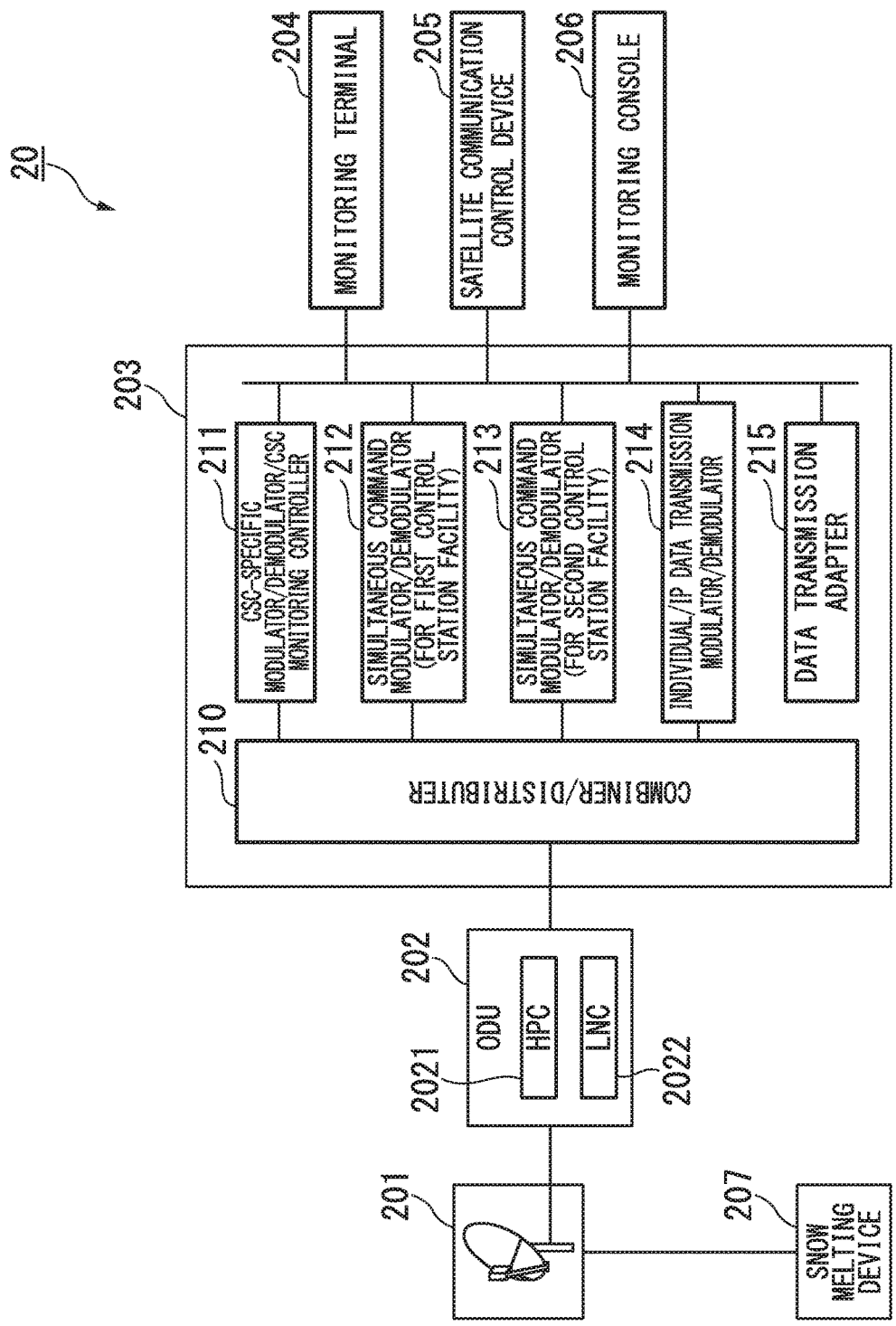
FIG. 6 is a schematic block diagram illustrating a functional configuration of a control center facility 20.

FIG. 6 is a schematic block diagram illustrating a functional configuration of the control center facility 20.

The control center facility 20 includes an antenna 201, an ODU 202, an IDU 203, a monitoring terminal 204, a satellite communication control device 205, a monitoring console 206, and a snow melting device 207.

The antenna 201 performs communication with the communication satellite 40. The antenna 201 has a snow accretion prevention function of the snow melting device 207.

The ODU 202 performs frequency conversion into a frequency band for use in the satellite communication and amplifies power of a signal. The ODU 202 includes an HPC 2021 and an LNC 2022.

The HPC 2021 performs frequency conversion of an IP signal to be transmitted and amplifies power.

The LNC 2022 performs amplification and frequency conversion on an RF signal input from the antenna 201 and outputs a signal after the amplification and the frequency conversion to the IDU 203.

The IDU 203 includes a combiner/distributer 210, a CSC-specific modulator/demodulator/CSC monitoring controller 211, a simultaneous command modulator/demodulator 212, a simultaneous command modulator/demodulator 213, an individual/IP data transmission modulator/demodulator 214, and a data transmission adapter 215.

The combiner/distributer 210 combines or distributes a signal.

The CSC-specific modulator/demodulator/CSC monitoring controller 211 modulates or demodulates a signal transmitted/received to/from a control station (not illustrated).

The simultaneous command modulator/demodulator 212 demodulates information transmitted from the first control station facility 10-1 using a simultaneous command link.

The simultaneous command modulator/demodulator 213 demodulates information transmitted from the second control station facility 10-2 using a simultaneous command link.

The individual/IP data transmission modulator/demodulator 214 modulates or demodulates a signal of an individual/IP data transmission link. For example, the individual/IP data transmission modulator/demodulator 214 is used in phone communication or the like.

The data transmission adapter 215 converts a protocol and a format of a packet to be transmitted/received by the individual/IP data transmission modulator/demodulator 214.

The monitoring terminal 204 inputs and displays the commands of the user. For example, the monitoring terminal 204 is configured using an industrial personal computer (for example, a factory automation-personal computer (FA-PC)). The monitoring terminal 204 includes a phone, a monitoring terminal control device, a monitor, and a power supply. The phone is used for a conversation with a user of another station. The monitoring terminal control device controls the entire monitoring terminal 204. The monitoring terminal control device outputs the commands from the user to the satellite communication control device. The monitor is an image display device such as a liquid crystal display, an organic EL display, or the like. The monitor displays information. The power supply supplies each functional unit with supplied power.

The satellite communication control device 205 controls the IDU 203 to transmit an commands input by the monitoring terminal 204 or the monitoring console 206.

The monitoring console 206 includes an alert operation display, a monitoring console processing device, a monitor, and a power supply. The alert operation display displays an alert for an operation performed by the monitoring console processing device. The monitoring console processing device is configured using a programmable logic controller (PLC). The monitoring console processing device is connected to the monitor. The monitoring console processing device outputs the input commands to the satellite communication control device 205 via the monitor. The monitor is, for example, a touch panel. The monitor receives an input of an operation commands from the user. The power supply supplies each functional unit with supplied power.

The snow melting device 207 is a heater. The snow melting device 207 detects the snowfall on the antenna 201 to melt the snow.

Figure 7:
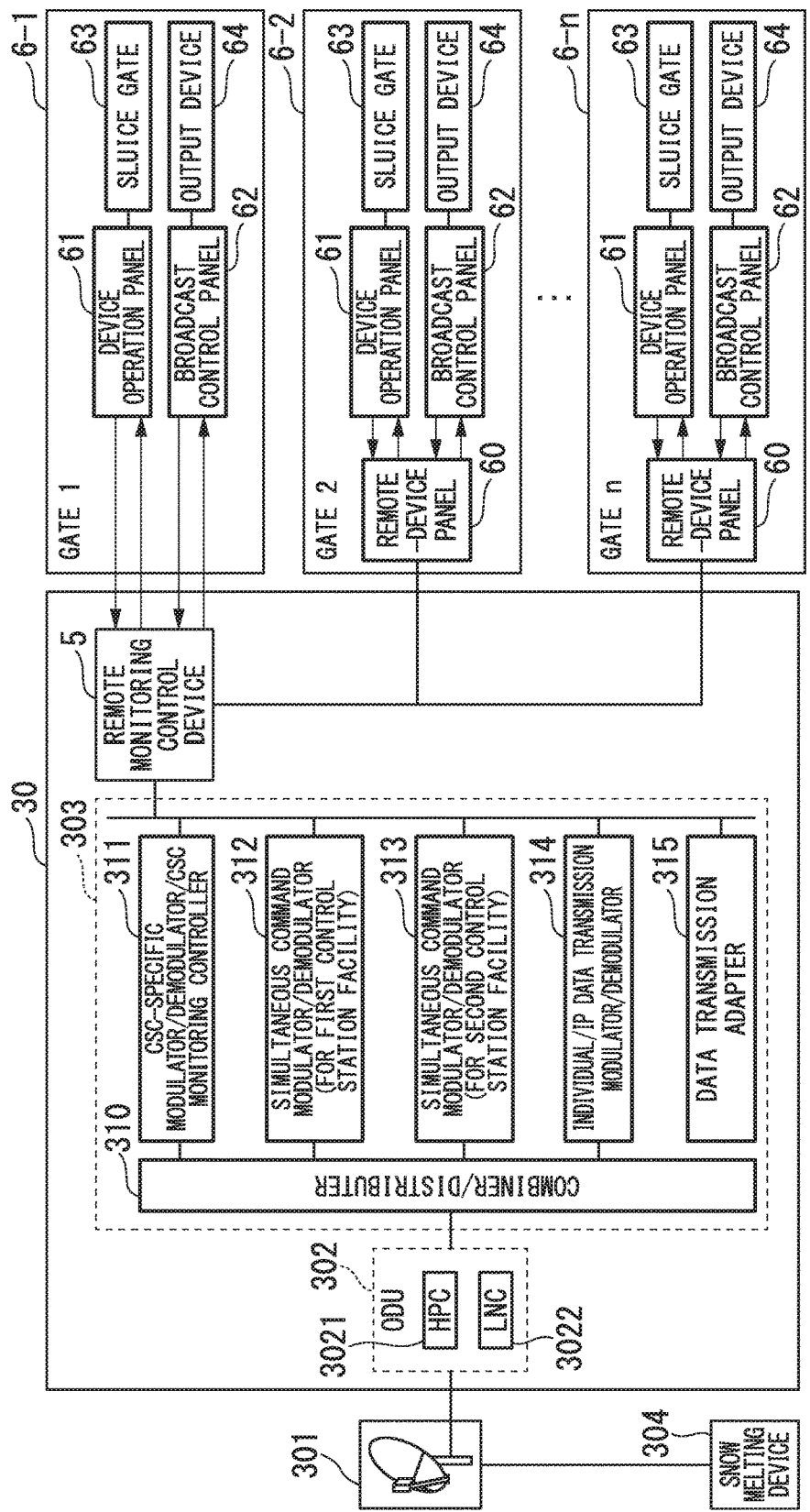
FIG. 7 is a schematic block diagram illustrating a functional configuration of a slave station 30.

FIG. 7 is a schematic block diagram illustrating a functional configuration of the slave station 30.

The slave station 30 includes an antenna 301, an ODU 302, an IDU 303, a remote monitoring control device 5, and a snow melting device 304.

The antenna 301 performs communication with the communication satellite 40. The antenna 301 has a snow accretion prevention function of a sheet radome.

The ODU 302 performs frequency conversion into a frequency band for use in the satellite communication and amplifies power of a signal. The ODU 302 includes an HPC 3021 and an LNC 3022.

The HPC 3021 performs frequency conversion of an IP signal to be transmitted and amplifies power.

The LNC 3022 performs amplification and frequency conversion on an RF signal input from the antenna 301 and outputs a signal after the amplification and the frequency conversion to the IDU 303.

The IDU 303 includes a combiner/distributer 310, a CSC-specific modulator/demodulator/CSC monitoring controller 311, a simultaneous command modulator/demodulator 312, a simultaneous command modulator/demodulator 313, an individual/IP data transmission modulator/demodulator 314, and a data transmission adapter 315.

The combiner/distributer 310 combines or distributes a signal.

The CSC-specific modulator/demodulator/CSC monitoring controller 311 modulates or demodulates a signal transmitted/received to/from a control station (not illustrated).

The simultaneous command modulator/demodulator 312 demodulates a simultaneous command transmitted from the first control station facility 10-1 using a simultaneous command link.

The simultaneous command modulator/demodulator 313 demodulates a simultaneous command transmitted from the second control station facility 10-2 using a simultaneous command link.

The individual/IP data transmission modulator/demodulator 314 modulates or demodulates a signal of an individual/IP data transmission link. For example, the individual/IP data transmission modulator/demodulator 314 is used in phone communication or the like.

The data transmission adapter 315 converts a protocol and a format of a packet to be transmitted/received by the individual/IP data transmission modulator/demodulator 314.

The snow melting device 304 is a heater. The snow melting device 304 detects the snowfall on the antenna 301 to melt the snow.

The gate 6-1 includes a device-side operation panel 61, a broadcast control panel 62, a sluice gate 63, and an output device 64. The device-side operation panel 61 is controlled by the slave station 30 and outputs device information for monitoring to the slave station 30. Also, the device-side operation panel 61 performs opening-closing control of the sluice gate 63. For example, the device-side operation panel 61 controls opening-closing of the sluice gate 63, for example, by controlling the driving of the motor.

The broadcast control panel 62 is controlled by the slave station 30 and outputs device information for monitoring to the slave station 30. The broadcast control panel 62 controls the output device 64. The output device 64 is, for example, a speaker, a sound collecting microphone, a siren sound collecting microphone, an electronic display board, or the like.

The gates 6-2 to 6-$n$ include a remote-device-side panel 60, a device-side operation panel 61, a broadcast control panel 62, a sluice gate 63, and an output device 64. Because the device-side operation panel 61, the broadcast control panel 62, the sluice gate 63, and the output device 64 perform processes similar to those of the functional units having the same names, description thereof will be omitted. The remote-device-side panel 60 relays communication with the slave station 30. The gates 6-2 to 6-n perform communication based on an optical fiber cable installed at a position separated from the slave station 30. Thus, the relay function as in the remote-device-side panel 60 is provided so that remote communication is enabled. Also, when a plurality of gates are installed near the slave station 30, the configurations of the gates are similar to that of the gate 6-1 and therefore cost can be reduced.

Figure 8:
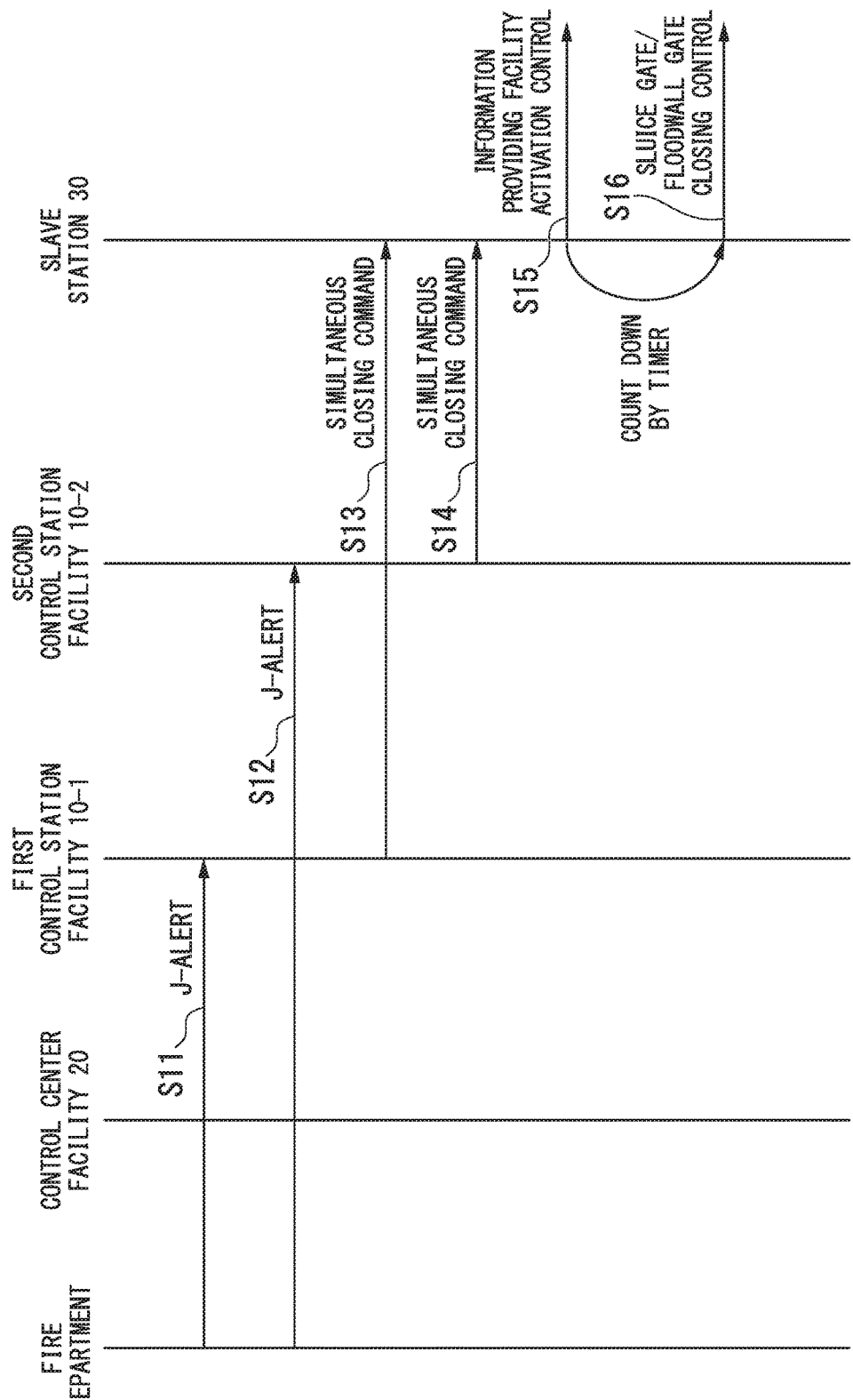
FIG. 8 is a sequence diagram illustrating an example of an automatic simultaneous closing process in the present embodiment.

FIG. 8 is a sequence diagram illustrating an example of an automatic simultaneous closing process in the present embodiment. An automatic simultaneous closing process is a process in which the control station facility 10 simultaneously closes the gates 6 when a J-ALERT is received. Also, although one slave station 30 is illustrated in FIG. 8, a plurality of slave stations 30 are arranged and the illustration of the other slave stations 30 is omitted. A similar process is assumed to be performed in the slave stations 30.

First, when a J-ALERT (for example, an alert of tsunami occurrence and a warning) is transmitted via the communication satellite 40 according to the occurrence of a large-scale disaster from a national agency (for example, a fire department or the like), the first control station facility 10-1 and the second control station facility 10-2 receive the J-ALERT (steps S11 and S12).

The first control station facility 10-1 receiving the J-ALERT transmits a simultaneous closing commands including a closing commands to the slave station 30 using a simultaneous command link 60 via the communication satellite 40 (step S13). At this time, the first control station facility 10-1 transmits the simultaneous closing commands to the slave station 30 at a first modulation rate (for example, 70 ksps (symbols per second)) using a downlink band of system 1.

On the other hand, the second control station facility 10-2 receiving the J-ALERT transmits a simultaneous closing commands including a closing commands to the slave station 30 using a simultaneous command link 61 via the communication satellite 40 (step S14). At this time, the second control station facility 10-2 transmits the simultaneous closing commands to the slave station 30 at the first modulation rate using a downlink band of system 2.

When the simultaneous closing commands is received from at least any one of the first control station facility 10-1 and the second control station facility 10-2, the slave station 30 transmits a control signal for activating an information providing facility managed by the slave station 30 (step S15). The information providing facility is activated and therefore a notification of the closing of the gate 6 is provided in the vicinity of the gate 6. Here, the information providing facility is a display device or a sound output device such as a microphone provided in the vicinity of the gate 6.

Next, the slave station 30 starts a timer for determining whether a predetermined time has elapsed after a control signal for activating the information providing facility is transmitted to the information providing facility. The "predetermined time" can be preset by a value of the timer. For example, a time in which a simultaneous closing commands is transmitted, the information providing facility is activated, and evacuation into an inner side of the gate 6 is possible before the gate 6 is closed can be set by the value of the timer. As the value set in the timer, a value differing according to a terrain in which the gate 6 is installed or the predicted number of humans/cars around the gate 6 may be set.

The slave station 30 transmits the simultaneous closing commands, counts down the timer in which a predetermined value is set, and determines whether a predetermined time has elapsed. When it is determined that the predetermined time has elapsed, the slave station 30 transmits a control signal for closing the gate 6 to be closed to the gate 6 (step S16). Thereby, the gate 6 is automatically closed.

Thus, in the automatic simultaneous closing process, the closing commands is transmitted to all the gates 6 using the reception of the J-ALERT as a trigger.

Because the automatic simultaneous closing process is executed in such a process, the slave station 30 can secure an evacuation time and control the gate 6 even when communication between the control station facility 10 and the slave station 30 is temporarily disabled due to an influence of rainfall or the like.

Figure 9:
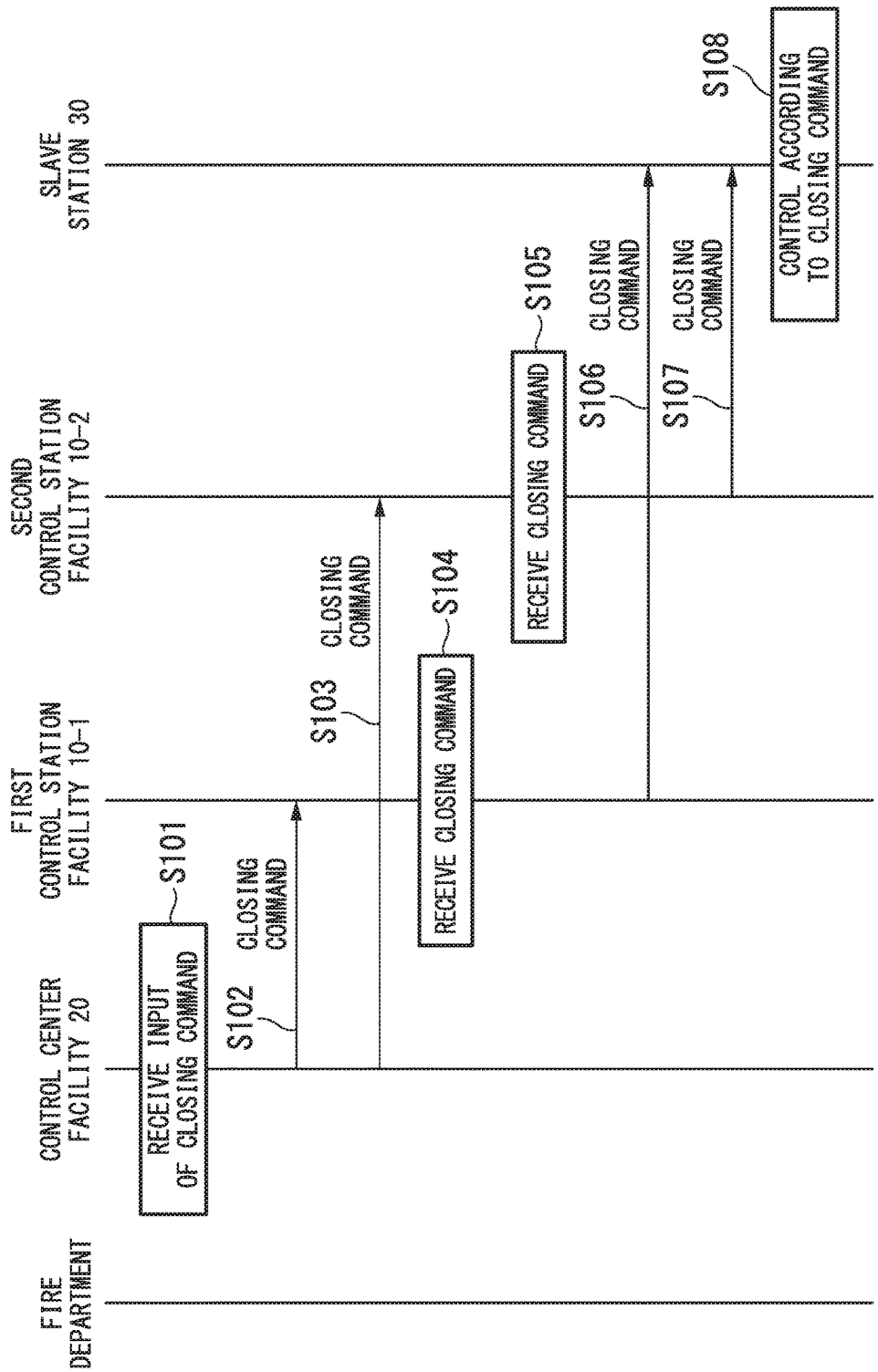
FIG. 9 is a sequence diagram illustrating a flow of a simultaneous command transmission process of a satellite communication system 100 in the present embodiment.

FIG. 9 is a sequence diagram illustrating a flow of a simultaneous command transmission process in which the control center facility 20 closes the gate 6 in the present embodiment. An individual closing process is a process of individually closing the gate 6. In the individual closing process, the gate 6 which is not closed by the above-mentioned automatic simultaneous closing control is closed or a process is performed when a staff member of the control center facility 20 makes a determination not related to the automatic simultaneous closing. Also, a process when the staff member of the control center facility 20 determines that the closing is necessary will be described with reference to FIG. 9.

The control center facility 20 receives an input of an commands for closing the gate 6 determined to be closed from the staff member (step S101). When the commands for closing the gate 6 is input by the staff member, the same closing commands is simultaneously transmitted to the first control station facility 10-1 and the second control station facility 10-2 using the simultaneous command link (steps S102 and S103). For example, the control center facility 20 simultaneously performs the transmission of the closing commands to the first control station facility 10-1 using a simultaneous command link 64 of the uplink illustrated in FIG. 2 and the transmission of the closing commands to the second control station facility 10-2 using a simultaneous command link 65 of the uplink. At this time, the control center facility 20 transmits the closing commands to the first control station facility 10-1 at a second modulation rate (for example, 35 ksps) using an uplink band of system 1. Also, the control center facility 20 transmits the closing commands to the second control station facility 10-2 at the second modulation rate (for example, 35 ksps) using an uplink band of system 2. Thus, the control center facility 20 transmits the closing commands to the first control station facility 10-1 and the second control station facility 10-2 without having to perform switching between the first control station facility 10-1 and the second control station facility 10-2.

The first control station facility 10-1 receives the closing commands transmitted from the control center facility 20 via the simultaneous command link (step S104). The second control station facility 10-2 receives the closing commands transmitted from the control center facility 20 via the simultaneous command link 65 (step S105). In response to the received closing commands, the first control station facility 10-1 transmits the simultaneous closing commands to the slave station 30 connected to the gate 6 to be individually closed using the simultaneous command link 60 of the downlink illustrated in FIG. 2 (step S106). At this time, the first control station facility 10-1 transmits the simultaneous closing commands to the slave station 30 at the first modulation rate using a downlink band of system 1.

In response to the received closing commands, the second control station facility 10-2 transmits the simultaneous closing commands to the slave station 30 connected to the gate 6 to be individually closed using the simultaneous command link 61 of the downlink illustrated in FIG. 2 (step S107). At this time, the second control station facility 10-2 transmits the simultaneous closing commands to the slave station 30 at the first modulation rate using a downlink band of system 2.

When the closing commands is received from the first control station facility 10-1 or the second control station facility 10-2, the slave station 30 transmits the received closing commands to the gate 6 (step S108). As described above, in the individual closing process, the closing commands is transmitted to the gate 6 to be closed using a request from the control center facility 20 as a trigger.

In FIGS. 8 and 9, the slave station 30 transmits a response indicating the state (for example, the opened/closed state) of the gate 6 to the first control station facility 10-1 via the communication satellite 40 using the simultaneous command link 66 of the uplink illustrated in FIG. 2 after the closing commands is transmitted to the gate 6. Further, the slave station 30 transmits a response indicating the state (for example, the opened/closed state) of the gate 6 to the second control station facility 10-2 via the communication satellite 40 using the simultaneous command link 67 of the uplink illustrated in FIG. 2 after the closing commands is transmitted to the gate 6. The first control station facility 10-1 and the second control station facility 10-2 transmit the received responses to the control center facility 20.

Next, mutual monitoring between the control station facilities 10 will be described using FIGS. 1 and 2.

The first control station facility 10-1 monitors the simultaneous command link 61 and a simultaneous command link 63 having a downlink band of system 2. Also, the second control station facility 10-2 monitors the simultaneous command link 60 and a simultaneous command link 62 having a downlink band of system 1. Thus, in the satellite communication system 100 in the present embodiment, the downlink band of system 2 to be used for communication by the second control station facility 10-2 is monitored by the first control station facility 10-1 and the downlink band of system 1 to be used for communication by the first control station facility 10-1 is monitored by the second control station facility 10-2. Also, in the satellite communication system 100 in the present embodiment, the closing commands is transmitted using different routes for the same information without performing switching between a currently used link and a reserved link when two simultaneous command links are used and the communication of any one of the two simultaneous command links is disabled as illustrated in FIG. 2.

Next, the monitoring of states of other stations (for example, another control station facility 10, another control center facility 20, and another slave station 30) by the control station facility 10 will be described. The states of the other stations are monitored by the monitoring console 107 of the control station facility 10. More specifically, results of monitoring the states of the other stations are aggregated by the link connection control device 104 and the aggregated monitoring results are output to the monitoring console 107, so that the satellite-based remote monitoring base 1071 displays the output monitoring results on the monitor 1072. The states of the other stations indicate, for example, whether each station is operating normally, malfunctioning, outside the monitoring/control target, not responding, or stopped, whether the snow melting device is operating, etc. Also, the satellite-based remote monitoring base 1071 displays whether each functional unit provided in the other station is operating normally, malfunctioning, outside the monitoring/control target, not responding, or stopped, or whether the snow melting device is operating or stopped as the state of the other station on the monitor 1072. Hereinafter, specific examples will be described in detail.

Figure 10:
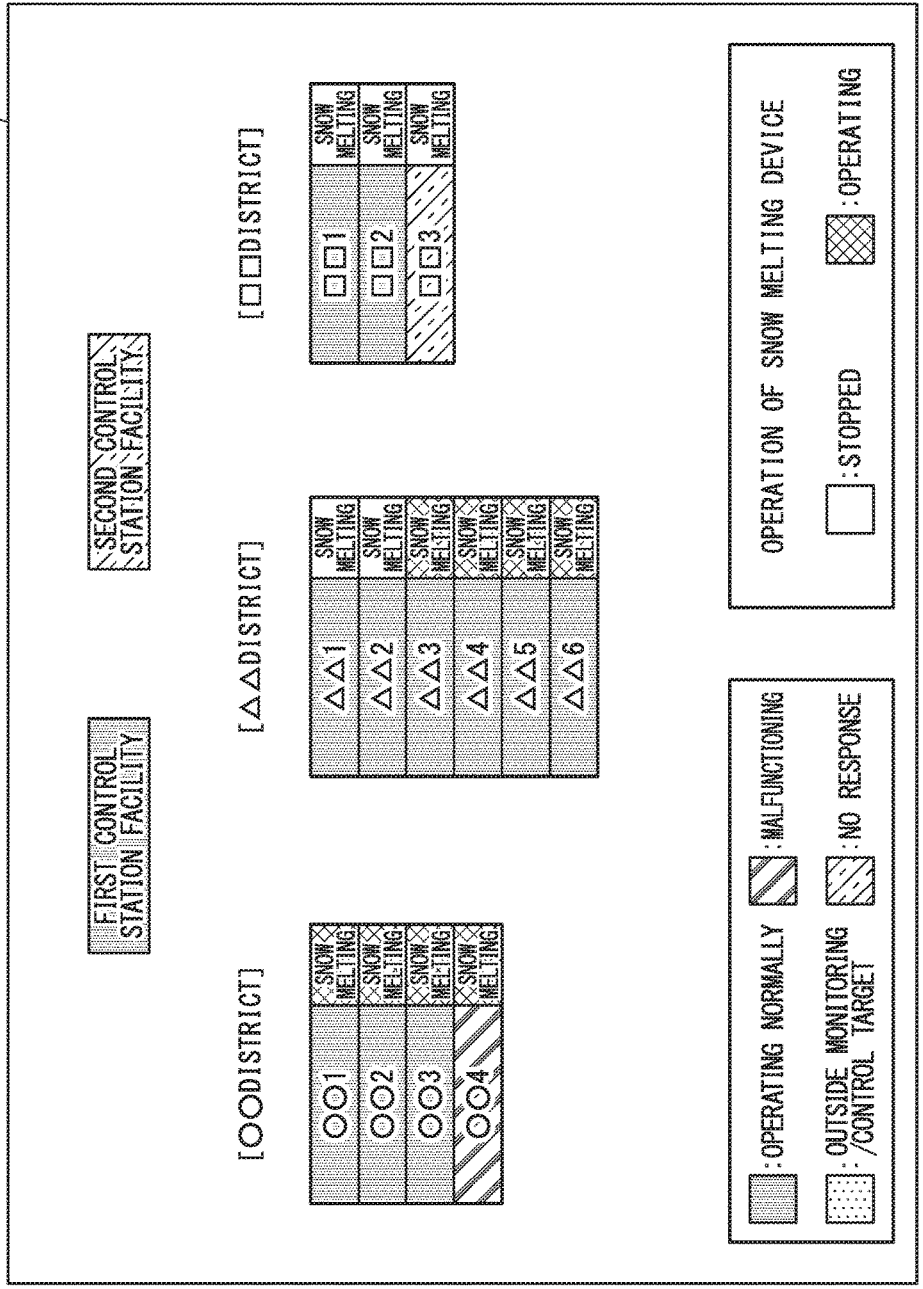
FIG. 10 is a diagram illustrating all monitoring results of stations monitored by a control station facility 10.

FIG. 10 is a diagram illustrating all monitoring results of stations monitored by the control station facility 10. The screen illustrated in FIG. 10 is displayed on the monitor 1072. The example illustrated in FIG. 10 is a monitoring result displayed on the monitor 1072 provided in the first control station facility 10-1. In FIG. 10, the second control station facility 10-2 monitored by the first control station facility 10-1 and monitoring states of the control center facility 20 and the slave station 30 provided in each district (indicated by OO, ΔΔ, or ¨ or in FIG. 10) are illustrated. In the example illustrated in FIG. 10, the second control station facility 10-2 and the facility of □□ 3 of _ district is displayed to be in the non-response state. Also, in the example illustrated in FIG. 10, a malfunction is displayed to occur in the facility of OO 4 of OO district. Stations other than second control station facility 10-2, the facility of ⌊⌋ 3 of ⌊⌋ district, and the facility of OO 4 of OO district are displayed to operate normally.

The monitoring result of the non-response state is displayed for a station from which a response to the transmission from the control station facility 10 is not obtained. The malfunctioning monitoring result is displayed when there is a response, but any error is detected in a device within the station. The monitoring result outside the monitoring/control target is displayed for a station which is not monitored/controlled by the control station facility 10. The monitoring result of the normal operation is displayed for a station for which a signal is not transmitted/received to/from the control station facility 10 and the device within the station is normal. The monitoring results are determined by the satellite-based remote monitoring base 1071.

Also, in the example illustrated in FIG. 10, whether the snow melting device is operating or stopped for each slave station 30 provided in each district is displayed as the state of each station. Thus, the state of the snow melting facility is also individually displayed in addition to the states of the control center facility 20 and the slave station 30. Thereby, the user can find that any malfunction is likely to occur in the snow melting facility when the snow melting facility operates during the summer on an uninhabited island or when the snow melting facility does not operate during the winter.

Figure 11:
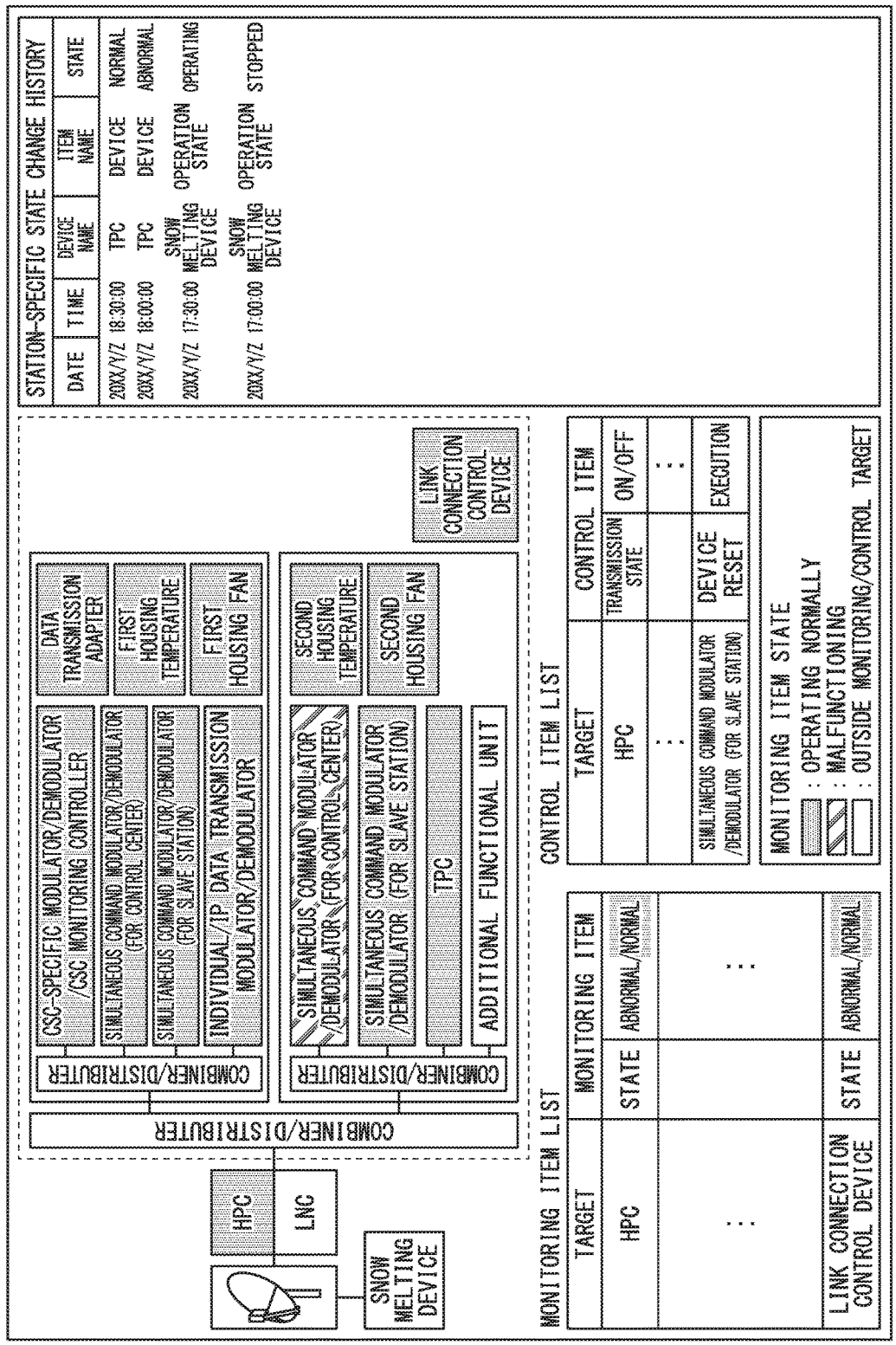
FIG. 11 is a diagram illustrating a monitoring result of an own station.
Figure 12:
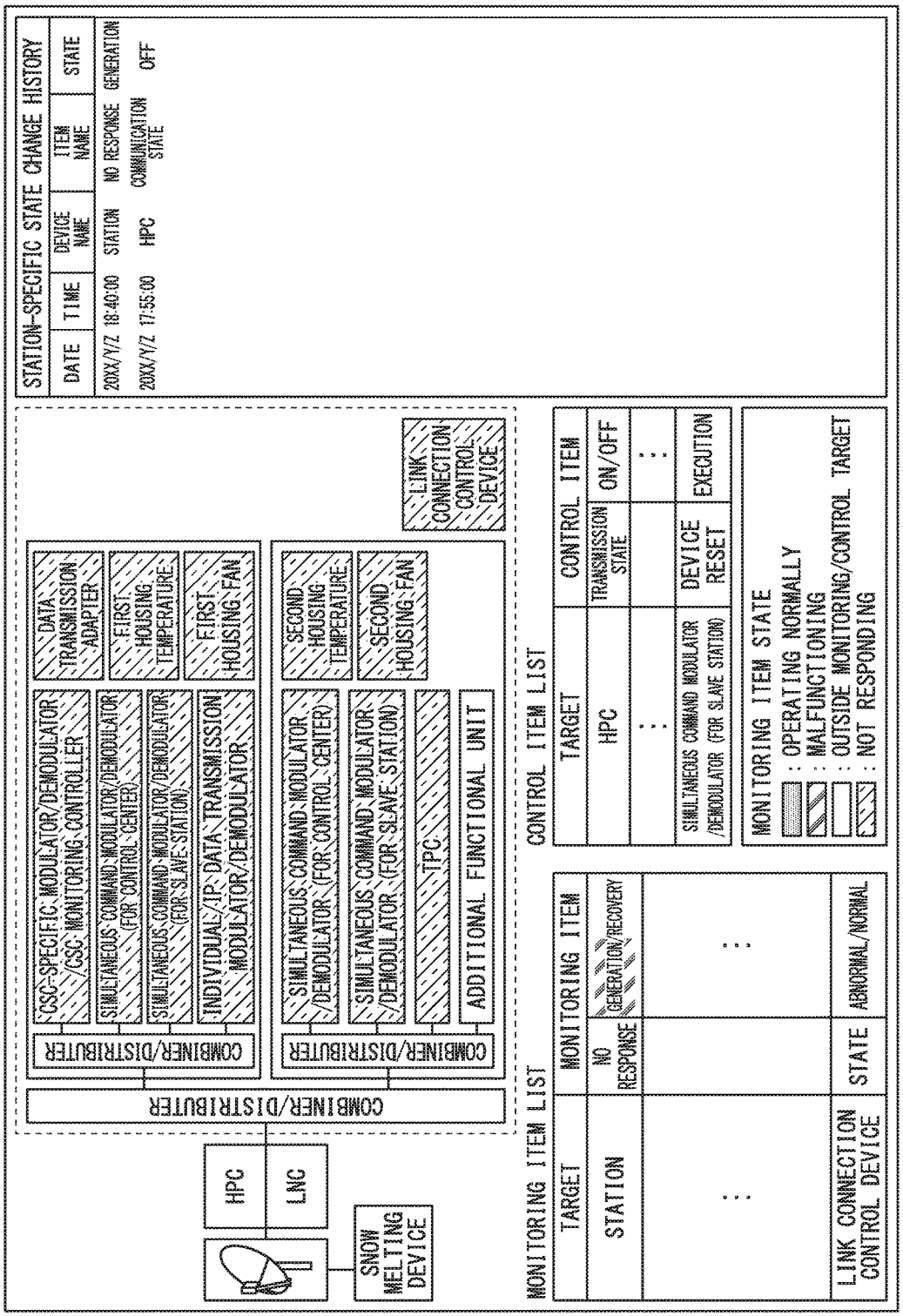
FIG. 12 is a diagram illustrating a monitoring result of another control station facility 10.
Figure 13:
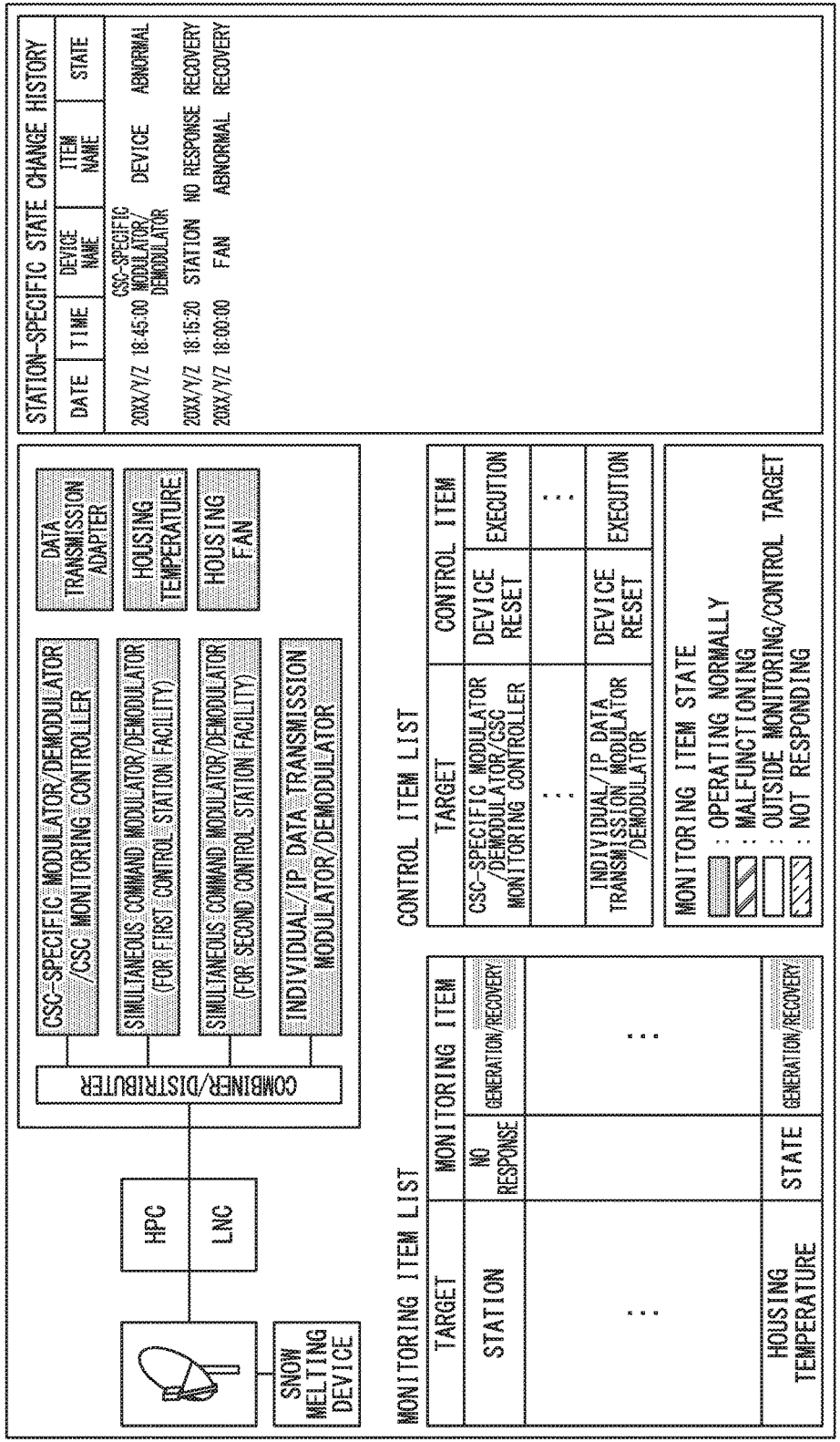
FIG. 13 is a diagram illustrating a monitoring result of a control center facility 20.
Figure 14:
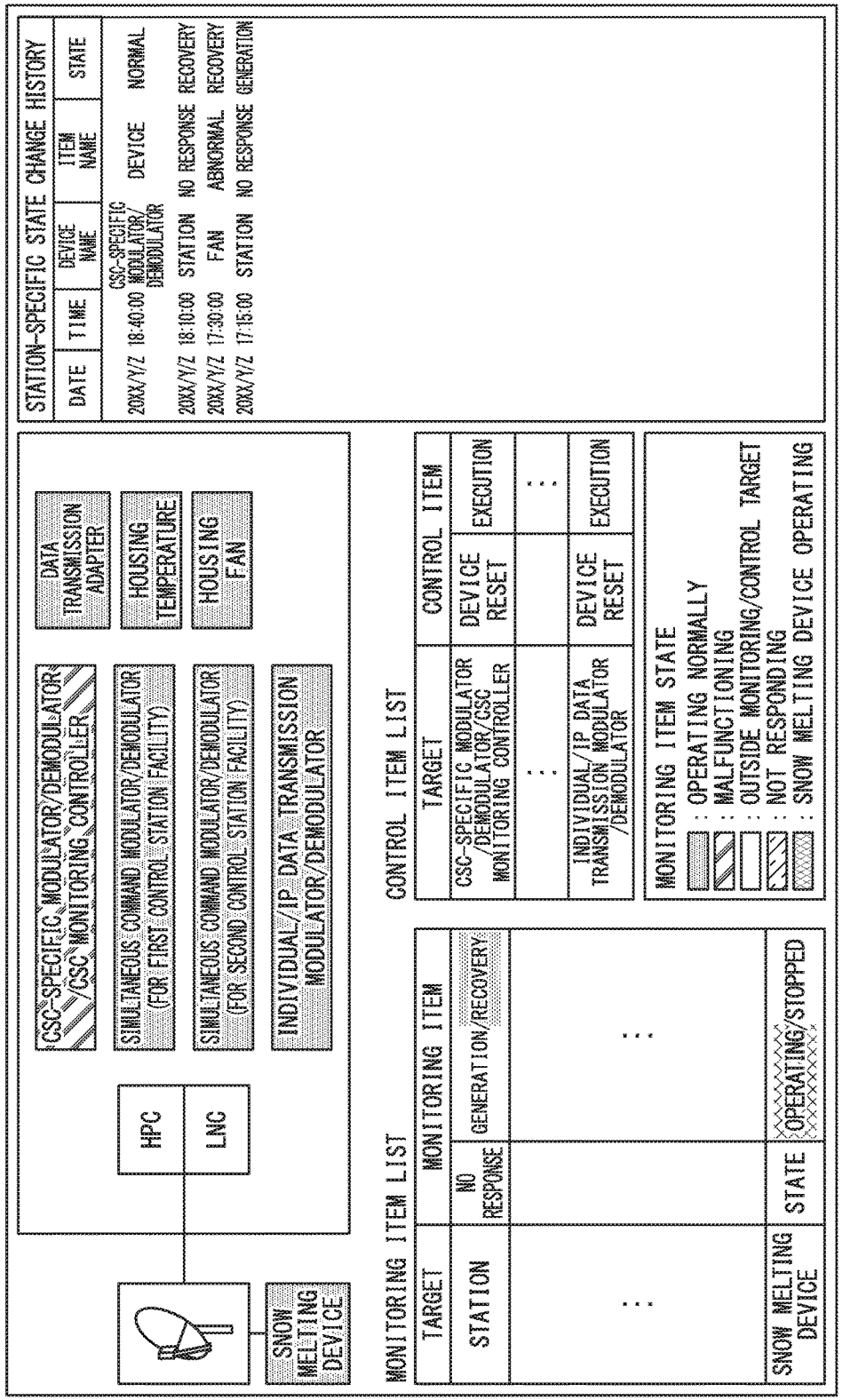
FIG. 14 is a diagram illustrating a monitoring result of a slave station.

Next, a result of monitoring each station by the control station facility 10 will be described using FIGS. 11 to 14. A station-specific monitoring result is displayed on the monitor 1072 according to the user's operation. FIG. 11 is a diagram illustrating a monitoring result of an own station. FIG. 12 is a diagram illustrating a monitoring result of another control station facility 10. FIG. 13 is a diagram illustrating a monitoring result of the control center facility 20. FIG. 14 is a diagram illustrating a monitoring result of the slave station. Because items displayed in FIGS. 11 to 14 are similar, an example of FIG. 11 will be described.

In FIG. 11, information about each functional unit of the station (the own station in FIG. 11) to be monitored, a monitoring item list, a control item list, and a station-specific station change history is displayed as the station-specific monitoring result. The information about each functional unit indicates whether each function provided in the station is operating normally, malfunctioning, or outside the monitoring/control target. In the monitoring item list, a target and a monitoring item are shown. The target indicates a functional unit to be monitored and the monitoring item indicates a monitoring result of a state of the functional unit to be monitored. Functional units to be monitored are all functional units provided in the station (the own station in FIG. 11) to be monitored.

In the control item list, a target and a control item are shown. The target indicates a functional unit to be controlled and the control item indicates control content of the functional unit to be controlled. For example, when the target is an HPC, whether to perform the control of ON or OFF of a transmission function serving as the control item is indicated. Also, for example, when the target is the CSC-specific modulator/demodulator/CSC monitoring controller, whether to control the execution of a device reset operation as the control item is indicated. Functional units to be controlled are, for example, some functional units provided in a station to be monitored such as an HPC, a modulation/demodulation unit, and a demodulation unit.

For example, in the case of the control station facility 10, a CSC-specific modulator/demodulator/CSC monitoring controller, a simultaneous command modulation/demodulation unit (for a control center), a simultaneous command modulation/demodulation unit (for a slave station), an individual/IP data transmission modulation/demodulation unit, a simultaneous command monitoring demodulation unit (for the control center), and a simultaneous command monitoring demodulation unit (for the slave station) are indicated in the target items in the control item list. Also, in the case of the control center facility 20, a CSC-specific modulator/demodulator/CSC monitoring controller, a simultaneous command modulation/demodulation unit (for a first control station facility), a simultaneous command modulation/demodulation unit (for a second control station facility), and an individual/IP data transmission modulation/demodulation unit are indicated in the target items in the control item list. Also, in the case of the slave station 30, a CSC-specific modulator/demodulator/CSC monitoring controller, a simultaneous command modulation/demodulation unit (for the first control station facility), a simultaneous command modulation/demodulation unit (for the second control station facility), and an individual/IP data transmission modulation/demodulation unit are indicated in the target items in the control item list.

The station-specific state change history is a history of a change in a state of each functional unit provided in the station. The station-specific state change history is indicated by, for example, a date, a time, a device name, an item name, and a state. The date is a date on which a change in the state of the functional unit was detected. The time is a time at which a change in the state of the functional unit was detected. The device name indicates a functional unit from which a change in the state was detected. The item name indicates an item such as a device, an operation state, a device reset, or a transmission function. The state is a state after the detected change in the functional unit. The satellite-based remote monitoring base 1071 displays information about the state of each functional unit in a display mode according to the state after the change in the functional unit of the changed state every time the state of each functional unit changes as the station-specific state change history. An example is shown using FIG. 11.

As an example, the case in which a malfunction is detected in the TPC and the TPC returns to a normal state after several minutes will be described. When the malfunction is detected in the TPC, the satellite-based remote monitoring base 1071 first displays information indicating that the malfunction occurred in the TPC in the station-specific state change history in color indicating that the malfunction occurred. For example, the satellite-based remote monitoring base 1071 displays a date of 20XX/Y/Z, a time of 18:00:00, a device name of TPC, an item name of Device, and the state of Abnormal as illustrated in FIG. 11. Also, when the color indicating that the malfunction occurred is red, the satellite-based remote monitoring base 1071 displays information about the date, the time, the device name, the item name, and the state in the station-specific state change history in red.

When the TPC returns to the normal state after several tens of minutes (for example, after 30 minutes), the satellite-based remote monitoring base 1071 first displays information indicating that the TPC returned to the normal state in the station-specific state change history in color indicating that the TPC is operating normally. For example, the satellite-based remote monitoring base 1071 displays a date of 20XX/Y/Z, a time of 18:30:00, a device name of TPC, an item name of Device, and the state of Normal as illustrated in FIG. 11. Also, when the color indicating that the TPC is operating normally is green, the satellite-based remote monitoring base 1071 displays information about the date, the time, the device name, the item name, and the state in the station-specific state change history in green.

In the above example, the satellite-based remote monitoring base 1071 may display information about the date, the time, the device name, the item name, and the state while replacing the color of text with a color according to the changed state, display the information while replacing the color of a background with a color according to the changed state, and display the information in any other method in which the functional unit of the changed state can be displayed in a display mode according to the changed state.

As described above, information about a state of each functional unit is displayed on the monitor 1072 in various types of display. Thereby, the user can find any information indicating when the state changed for any state of the functional unit at present while viewing the screen. It is possible to immediately cope with an error when the error occurs for a long time. Also, in the control station facility 10, it is possible to mutually perform remote monitoring and transmission control.

According to the satellite communication system 100 configured as described above, it is possible to improve the reliability of the system in satellite communication. Hereinafter, the effect will be described in detail.

In the satellite communication system 100, the same gate closing control information is simultaneously transmitted from the control center facility 20 to a plurality of control station facilities 10 in different installation places using a simultaneous command link of system 2, and transmitted from each control station to the slave station 30. Also, the control response is simultaneously transmitted from the slave station 30 to the plurality of control station facilities 10 in the different installation places and transmitted from each control station facility 10 to the control center facility 20. Therefore, even when a problem occurs in one system or the control station facility 10, information is transmitted to the slave station 30 according to another system. Thus, information about a simultaneous command can be likely to be transmitted to the control center facility 20 and the slave station 30. Thus, it is possible to improve the reliability of the system in satellite communication.

Also, in communication between the control station facility 10 and the slave station 30, a band which is wider than a band used in communication between the control station facility 10 and the control center facility 20 is used. Therefore, it is possible to transmit information required in an emergency such as a closing commands to the slave station 30 at an early stage.

Also, the control station facility 10 in the present embodiment has a TPC function. Thereby, it is possible to suppress an influence of rainfall which is problematic in satellite communication.

Also, the first control station facility 10-1 and the second control station facility 10-2 can mutually perform monitoring. Therefore, it is possible to detect a malfunction of a communication partner station at an early stage.

Also, a snow accretion prevention function of the snow melting device is provided in antennas of the control station facility 10 and the control center facility 20. According to this function, it is possible to suppress the influence of transmission/reception due to the snow accretion.

Also, by performing full duplication without performing switching control of a simultaneous link using the first control station facility 10-1 and the second control station facility 10-2, the redundancy of information transmission is enabled without requiring a complex switching operation. Also, a system having high reliability without performing a complex switching operation can be constructed.

Also, according to the satellite communication system 100 configured as described above, the control station facility 10 displays information about a state of each station monitored by the control station facility 10. Therefore, the user of the control station facility 10 can find a current state of each station and a current state of the functional unit provided in each station. Thereby, when a malfunction occurs, it is possible to specify a station in which the malfunction occurs and cope with the malfunction. Thus, it is possible to improve the reliability of the system.

Hereinafter, a modified example will be described.

The snow accretion prevention function of a sheet radome may be provided in the antenna 301 of the slave station 30 in place of the snow melting device. According to this function, it is possible to suppress the influence of transmission/reception due to snow accretion and reduce maximum power consumption more than the snow melting function of melting snow using the entire mirror surface as a heater.

The ODU 102 and the IDU 103 of the control station facility 10 may be configured as one device. The ODU 202 and the IDU 203 of the control center facility 20 may be configured as one device. The ODU 302 and the IDU 303 of the slave station 30 may be configured as one device.

Each screen illustrated in FIGS. 10 to 15 is an example and any screen may be used as long as necessary information is displayed in each of FIGS. 10 to 15. For example, it is only necessary to display at least some information about a block diagram, a monitoring item list, a control item list, and a station-specific state change history in the screens of FIGS. 11 to 14.

According to at least several embodiments described above, the first control station facility 10-1 which transmits a closing commands via the communication satellite 40, the second control station facility 10-2 which is installed in a place geographically separated from the first control station facility 10-1 and transmits the closing commands via the communication satellite 40, and the slave station 30 which performs closing control of the gate 6 on the basis of the closing commands received from the first control station facility 10-1 or the second control station facility 10-2 are provided, thereby improving the reliability of the system in the satellite communication.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A satellite communication system comprising a control station and one or more slave stations controlling a gate, wherein:
the control station is composed of a first control station connected through a simultaneous band of a first system to the control station and a second control station connected through a simultaneous band of a second system to the control station;
the second control station is installed in a place geographically separated from the first control station to reduce the influence of rain or the like in satellite communications;
the first control station is connected to each of the at least one or more slave stations through an additional band of the first system configured to transmit control data for closing of the gate,
the second control station is connected to each of the at least one or more slave stations through an additional band of the second system configured to transmit the control data for closing of the gate according to reception of emergency information about disaster, each of the simultaneous band of the first link and the simultaneous band of the second link has a narrower bandwidth than each of the additional band of the first link and the additional band of the second link; and
the one or more slave stations is configured to control closing of the gate based on the control data which was received at an early stage among a plurality of received control data.

2. The satellite communication system according to claim 1,
wherein the control data has a synchronous word field, control signal field and Internet protocol (IP) data or sound data field, and
wherein the first control station and the second control station use a transmission band of the control signal field and the Internet protocol (IP) data or sound data field and transmit control data instructing closing of the gate.

3. The satellite communication system according to claim 1,
wherein each of the first control station and the-second control station receives a transmission signal transmitted from the other and determines whether an error occurs in mutual communication.

4. The satellite communication system according to claim 1,
wherein the first control station and the second control station detect a received electric field intensity of a signal transmitted from the satellite and control transmission power at the time of transmission of the control data according to the detected received electric field intensity.

5. The satellite communication system according to claim 1,
wherein the first control station and the second control station display information about the first control station and the second control station and the one or more slave stations.

6. The satellite communication system according to claim 5,
wherein the first control station and the second control station display information about a state for each monitoring target in a display mode in which the state is shown.

7. The satellite communication system according to claim 6,
wherein the first control station and the second control station display a state of each functional unit provided in the monitoring target and a history of a change in the state of the functional unit in a display mode in which the state is shown.

8. A data transmission method in satellite communication, the data transmission method comprising:
transmitting, by a first control station connected through an additional band of a first system, to each of one or more slave stations control data for closing of a gate according to reception of emergency information about a disaster;
transmitting, by a second control station installed in a place geographically separated from the first control station to reduce the influence of rain or the like in satellite communications, through a simultaneous band of a second system to each of the one or more slave stations the control data for closing of the gate according to reception of the emergency information about the disaster, each of the simultaneous band of the first link and the simultaneous band of the second link has a narrower bandwidth than each of the additional band of the first link and the additional band of the second link; and
controlling, by the one or more slave stations, closing of the gate based on the control data which was received at an earlier stage among a plurality of received control data.

9. The data transmission method in the satellite communication according to claim 8,
wherein the control data has a synchronous word field, control signal field and Internet protocol (IP) data or sound data field, and
wherein the first control station and the second control station use a transmission band of the control signal field and the Internet protocol (IP) data or sound data field and transmit control data instructing closing of the gate.

10. The data transmission method in the satellite communication according to claim 8,
wherein each of the first control station and the second control station receives a transmission signal transmitted from the other and determines whether an error occurs in mutual communication.

11. The data transmission method in the satellite communication according to claim 8,
wherein the first control station and the second control station detect a received electric field intensity of a signal transmitted from the satellite and control transmission power at the time of transmission of the control data according to the detected received electric field intensity.

12. The data transmission method in the satellite communication according to claim 8,
wherein the first control station and the second control station display information about the first control station and the second control station and the one or more slave stations.

13. The data transmission method in the satellite communication according to claim 12,
wherein the first control station and the second control station display information about a state for each monitoring target in a display mode in which the state is shown.

14. The data transmission method in the satellite communication according to claim 13,
wherein the first control station and the second control station display a state of each functional unit provided in the monitoring target and a history of a change in the state of the functional unit in a display mode in which the state is shown.

* * * * *